US005742320A

United States Patent [19]

Van Beek et al.

[11] Patent Number: 5,742,320

[45] Date of Patent: Apr. 21, 1998

[54] IMAGE-FORMING DEVICE AND AN IMAGE-FORMING ELEMENT FOR USE THEREIN

[75] Inventors: Frederik Maria Van Beek, Venlo; Antonius Jacobus Maria Claessens, Castenray; Paulus Henricus Eijmberts, Eindhoven; Johannes Gerardus Venantius Van Stiphout, Beek en Donk; Lambertus Johannes Maria Luyten, Venlo; Albert Gerardus Maria Van Welte, Baarlo, all of Netherlands

[73] Assignee: Oce-Technologies, B.V., Ma Venlo, Netherlands

[21] Appl. No.: 346,219

[22] Filed: Nov. 22, 1994

[30] Foreign Application Priority Data

Dec. 8, 1993 [NL] Netherlands .......................... 9302135

[51] Int. Cl.[6] .......................... B41J 2/385; G03G 9/08; G01D 15/24

[52] U.S. Cl. .......................... 347/153; 346/136; 347/55

[58] Field of Search .......................... 347/112, 147, 347/141, 150, 148, 153, 139; 355/200, 305; 346/136

[56] References Cited

U.S. PATENT DOCUMENTS

| | | | |
|---|---|---|---|
| 3,946,402 | 3/1976 | Lunde | 347/55 |
| 4,376,945 | 3/1983 | Hara et al. | 347/67 |
| 5,376,997 | 12/1994 | Yamato et al. | 399/356 |
| 5,384,175 | 1/1995 | Kojima et al. | 428/65.3 |

FOREIGN PATENT DOCUMENTS

| | | |
|---|---|---|
| 0191521 | 8/1986 | European Pat. Off. . |
| 0304983 | 3/1989 | European Pat. Off. . |
| 0247694 | 8/1991 | European Pat. Off. . |
| 0247699 | 8/1991 | European Pat. Off. . |
| 247699 | 8/1991 | European Pat. Off. . |

OTHER PUBLICATIONS

Webster's II New Riverside University Dictionary, p. 422 Eds Anne H. Soukhanov et al. Boston, MA: Houghton Mifflin Company, 1988.

Foreign Search Report 9302135 dated Aug. 25, 1994.

*Primary Examiner*—N. Le

*Assistant Examiner*—Raquel Yvette Gordon

*Attorney, Agent, or Firm*—Birch, Stewart, Kolasch & Birch, LLP

[57] ABSTRACT

An image-forming device comprising a movable image-recording element including a support with a dielectric surface layer and, beneath which, a set of separately energizable image-forming electrodes insulated from one another is provided, an image-forming zone situated along the trajectory of the image-recording element, in which zone a co-acting electrode is disposed a short distance above the dielectric surface of the image-recording element, and control means in order to apply a voltage between the image-forming electrodes and the co-acting electrode in accordance with an image pattern for recording, by depositing toner powder present in the image-forming zone on the surface of the image-recording element in accordance with the image pattern. The image-forming electrodes have an electrical resistivity of between 0.008 and 0.2 Ω.cm.

8 Claims, 2 Drawing Sheets

IMAGE-FORMING DEVICE AND AN IMAGE-FORMING ELEMENT FOR USE THEREIN

BACKGROUND OF THE INVENTION

1. Field of the Invention

The present invention relates to an image-forming device and, more specifically, to an image-forming configuration utilizing a novel image-forming element.

2. Discussion of Related Art

Image-forming devices of the nature herein discussed and image-recording elements usable therein are described, inter alia, in EP-A-0 191 521, EP-A-0 247 694 and EP-A-0 247 699. In these known devices, a toner powder image formed on the image-recording element in an image-forming zone is transferred directly, or indirectly via an intermediate medium, to a receiving material, such as ordinary paper, and fixed thereon. The image-recording element can then be used again for the next image-forming cycle. It has been found that in the known image-recording elements a number of problems may arise which are related to the electrical resistance of the image-forming electrodes.

On the one hand, a low resistance can lead to an excessive electrical current flowing through the electrodes, and this may result in burn-out of the image-forming electrodes. A burnt-out image-forming electrode then no longer contributes to image-formation, and this is visible on the print in the form of a fine toner-free streak in the image pattern. A burnt-out image-forming electrode may, therefore, necessitate replacement of the complete image-recording element. On the other hand, a high resistance of the image-forming electrodes results in such influence of the RC-circuit which, as a resistance component, contains the control means and the image-forming electrodes themselves and, as the capacitative component, the image-forming zone, that the speed of the image-forming process is very restricted. In addition, in an embodiment of the image-recording element as described in NL-A-9201892, wherein the control means consist of an array fixed in the wall of a cylindrical element, the proportion of the image-forming electrodes in the resistance component varies as a function of the distance peripherally between the position of the control means and the image-forming zone. A high resistance of the image-forming electrodes thus has an unacceptable effect on the total resistance.

SUMMARY OF THE INVENTION

Therefore, it is an object of the present invention to provide an image-forming device which will overcome the above-noted disadvantages.

It is a further object of the present invention to provide an image-forming device having an improved image-recording element, with which the problems occurring in the known image recording elements are largely obviated.

The foregoing objects and others are accomplished in accordance with the present invention, generally speaking, by providing an image-forming device comprising a movable image-recording element including a support with a dielectric surface layer and, beneath the dielectric surface layer, a set of separately energizabe image-forming electrodes insulated from one another, an image-forming zone situated along the trajectory of the image-recording element, in which zone a co-acting electrode is disposed a short distance above the dielectric surface of the image-recording element, and control means in order to apply a voltage between the image-forming electrodes and the co-acting electrode in accordance with an image pattern for recording, in order to selectively deposit toner powder present in the image-forming zone on the surface of the image-recording element in accordance with the image pattern.

According to the instant invention, the image-forming electrodes consist of an electrically conductive material having an electrical resistivity of between 0.008 and 0.2 Ω.cm. With such a resistance for the image-forming electrodes, it has been determined that in the image-forming elements of the kind described in the above prior art, wherein a voltage of 25–50 volts is applied to the electrodes, there is no risk of the image-forming electrodes burning out and a process speed of up to at least 20 meters per minute can be obtained without problems.

In another embodiment of the invention, the image-forming electrodes are made by constructing the electrodes as a number of grooves extending parallel to one another in the direction of movement of the support for the image-recording element, these grooves being filled with electrically conductive material. The required electrode resistivity of between 0.008 and 0.2 Ω.cm is obtained by a groove filling consisting of a first conductive layer on the surface of the grooves and a second conductive layer with which the remaining volume of the grooves is filled, the resistivity of the first conductive layer being lower by a factor of $0.125\times 10^3$–$2.10^3$ than that of the second conductive layer.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DISCUSSION OF THE INVENTION

Figure 1:
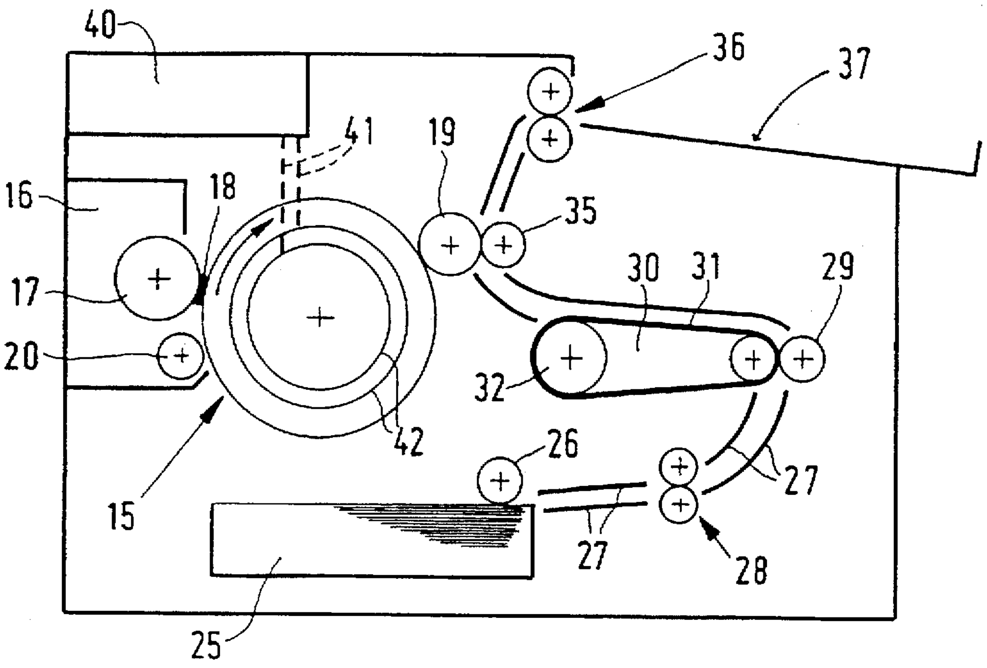
FIG. 1 is a diagram of an image-forming device according to the invention.

The image-forming device shown in FIG. 1 is provided with the image-recording element 15, which is described in detail hereinafter with reference to FIG. 2. The image-recording element 15 passes through an image-forming station 16, where its surface is provided with a uniform layer of toner powder having a resistivity of about $10^5$ Ω.cm by means 20 constructed as described in U.S. Pat. No. 3,946,402.

The powdered surface of the image-recording element 15 is then fed to an image-forming zone 18, where a magnetic roller 17 is disposed at a short distance from the surface of the image-recording element 15, the roller 17 comprising a rotatable electrically conductive non-magnetic shell and a stationary magnet system disposed inside the shell. The stationary magnet system comprises a ferromagnetic knife blade clamped between like poles of two magnets and is constructed as described in EP-A-0 304 983. A powder image is formed on the image-recording element by the application of a voltage between one or more image-forming electrodes of the image-recording element 15 and the conductive shell of the magnetic roller 17 operative as the co-acting or backing electrode. If no image is recorded, the magnetic roller 17 and the image-forming electrodes of the image-recording element 15 are maintained at earth potential. During image-recording the image-forming electrodes involved are brought to a positive potential of about 30 volts. This powder image is transferred, by the application of pressure, to a heated rubber-covered roller 19. A sheet of paper is taken from a supply stack 25 by roller 26 and is fed via paths 27 and rollers 28 and 29 to a heating station 30. The latter comprises an endless belt 31 running around a heated roller 32 in the direction of the arrow. The sheet of paper is heated by contact with the belt 31. The sheet of paper thus heated is then fed between roller 19 and a pressure roller 35, the softened powder image on roller 19 being completely transferred to the heated sheet of paper. The temperatures of the belt 31 and the roller 19 are so adapted to one another that the image fuses to the sheet of paper. The sheet of paper provided with an image is fed to a collecting tray 37 via conveyor rollers 36.

Unit 40 comprises an electronic circuit which converts the optical information of an original image into electrical signals which are fed, via wires 41 provided with trailing contacts, and conductive tracks 42 disposed in the side wall of the image-recording element 15, to the control elements 3 (see FIG. 2) connected to the tracks 42. The information is fed serially line by line to the shift register of the integrated circuits of the elements 3. If the shift registers are completely full in accordance with the information of one line, that information is put in the output register, and electrodes 6 and 5 (see FIG. 2) then receive voltage via the drivers or not depending on the signal. While this line is printed the information of the next line is fed to the shift registers. Apart from optical information originating from an original, electrical signals originating from a computer or a data processing system can also be converted in the unit 40 to signals fed to the control elements 3.

Figure 2:
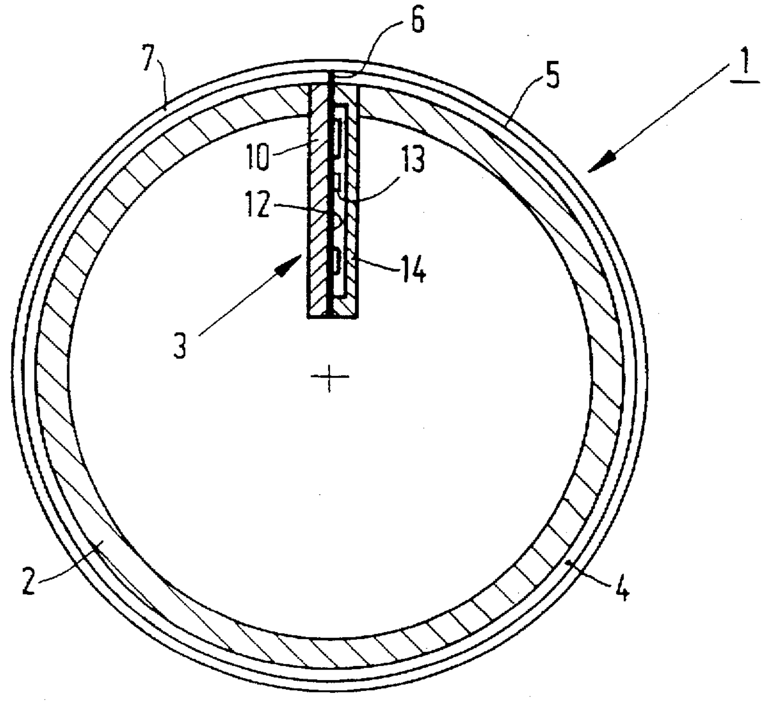
FIG. 2 is a cross-section of an image-recording element for use in the device of FIG. 1.

The image-recording element used in the image-forming device according to FIG. 1 is shown in diagrammatic cross-section in FIG. 2. The image-recording element 1 according to FIG. 2 comprises a cylinder 2 having disposed therein an axially extending control element 3 having a construction which will be described in detail hereinafter. The cylinder 2 is covered with an insulating layer 4 on which image-forming electrodes 5 are applied extending in the form of endless paths parallel to one another at substantially equal spacing in the peripheral direction of cylinder 2. Each image-forming electrode 5 is conductively connected to one of the control electrodes 6 of the control element 3. The number of control electrodes 6 of the control element 3 is equal to the number of image-forming electrodes 5, such number determining the quality of images to be formed on the image-recording element 1. Image quality improves with increasing electrode density. To achieve good quality, the number of image-forming electrodes 5 is at least 10 per millimeter and preferably 14 to 20 per millimeter. According to one specific embodiment, the number of electrodes 5 is equal to 16 per millimeter, the electrodes 5 having a width of 40 μm and the spacing between the electrodes being about 20 μm. Finally, the pattern of image-forming electrodes 5 is covered by a smooth dielectric top layer 7. In order to prevent burn-out of the image-forming electrodes and undue limitation of the image-forming device processing speed, the image-forming electrodes consist of an electrically conductive material having a resistivity of between 0.008 and 0.2 Ω.cm.

The control element 3 comprises a support 10 provided in a known manner with an electrically conductive metal layer (such as copper), which metal layer is converted to the required conductive track pattern 12 in the manner to be described hereinafter. The track pattern 12 consists, on the one hand, of the conductive connections between the various electronic components 13 of the control element and, on the other hand, the control electrodes 6 which are each conductively connected to one of the image-forming electrodes 5. Finally, the control element 3 also comprises a cover 14 connected in a manner known per se (e.g. some adhesive) to the support 10 to form a control element 3 in the form of a box containing the electronic components.

The electronic components 13 comprise a number of integrated circuits (I.C.'s) known, for example, from the video display technique, comprising a series-in parallel-out shift register, an output register and, connected thereto, drivers having a voltage range of, for example, 25 to 50 volts. Each control electrode 6 is connected to a driver of one of the integrated circuits.

The image-recording element 1 is made as follows. A control element 3 is made from a metal core substrate consisting of an aluminum support sheet to which a copper foil is glued by means of an electronic grade epoxy resin specially developed for the electronics industry, the copper foil being converted, by a known photo-etching technique, into a conductive track pattern 12 which comprises both the conductive connecting paths for the electronic components 13 to be placed on the support 10, and the conductive paths of the control electrodes 6. The electronic components 13 are then fixed on the support 10 at the correct place defining the conductive connecting paths and cover 14 is glued to the support 10 with an electronic grade epoxy resin.

The box-shaped control element 3 made in this way is then placed in an axial slot in the wall of aluminum cylinder 2 and secured fast therein by means of the above-mentioned epoxy resin glue. The axial slot is at least of a length equal to the working width of the image-recording element 1. With regard to the width of the axial slot in the cylinder 2, the space between the control element 3 and the wall of the slot must be so dimensioned that such space can be filled by the glue by capillary action. An excessive space results in the glue running out.

Figure 3:
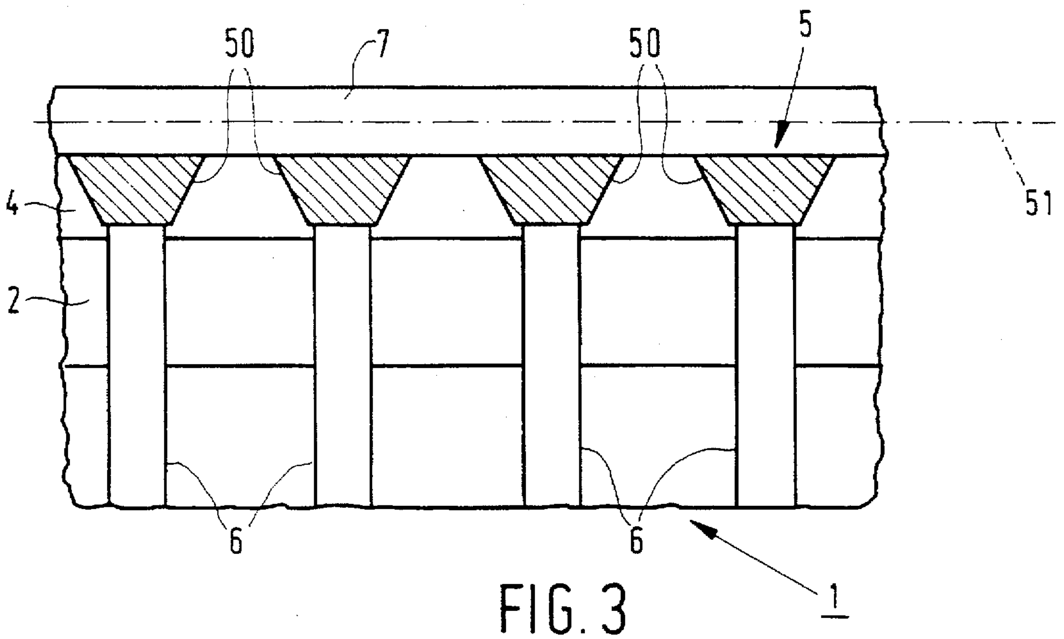
FIG. 3 is an enlarged scale cross-section in detail of a first embodiment of an image-recording element on the line III—III in FIG. 2.

The outer surface of the cylinder 2 with the control element 3 fixed therein is turned on a lathe to a predetermined size and brought into contact with a suitable etching liquid (e.g. a known alkaline potassium ferricyanide solution) so that the metal of the top layer of both the cylinder 2, the support 10, and the cover 14 is etched away over a specific depth, e.g. 150 μm. The etching liquid is so selected that the metal of the control electrodes 6 is only slightly affected, so that the ends of these electrodes finally project about 150 μm above the surface of the cylinder 2 and the control element 3. The surface of the cylinder 2 is then covered with an insulating intermediate layer 4 of electronic grade epoxy resin with a layer thickness equal to the length of the projecting ends of the electrodes 6, so that the end surfaces thereof lie at the outer surface of the insulating intermediate layer 4. This is achieved by applying a thicker intermediate layer 4 and then turning this layer on the lathe until the end faces of the electrodes 6 are exposed at the surface of the intermediate layer 4. The image-forming electrodes 5 are formed (as shown in FIG. 3), by cutting (e.g. on a lathe) a number of peripheral and parallel endless grooves 50 in the outer surface of the intermediate layer 4. The groove pattern is so applied that it corresponds completely (in respect of density and location) to the pattern of control electrodes 6, so that each control electrode 6 co-operates with one groove. The grooves 50 are filled with electrically conductive material, thus forming the conductive image-forming electrodes 5.

In a first embodiment of the recording element according to the invention, the grooves 50 in the insulating intermediate layer 4 are filled by applying an electrically conductive material over the complete surface of the image-recording element to a layer thickness indicated by broken line 51 in FIG. 3, and then turning this layer of electrically conductive material on the lathe down to the outer surface of the insulating intermediate layer 4. The pattern of electrically conductive image-forming electrodes 5, which are insulated from one another by the intermediate layer 4, is finally covered with a smooth dielectric top layer 7, which consists, for example, of a $SiO_x$ layer of a composition as described in Netherlands patent application 9301300.

In principle, any material having the required electrical resistance can be used for the electrically conductive material. Such a material may, for example, consist of a binder in which conductive particles are finely distributed, such as carbon, metal (copper or silver particles), metal complexes, quaternary ammonium compounds or conductive polymers or mixtures thereof.

If the above-mentioned $SiO_x$ is used as a dielectric material for the top layer 7 interconnecting the image-forming electrodes 5, an electrical resistance of between 0.008 and 0.5 Ω.cm is necessary for the electrodes 5 to achieve the required resistance of the electrodes 5, which must be lower than the resistance of the top layer 7. The control means to vary the electrical resistance when use is made of an above-mentioned conductive paste, is the quantity of conductive particles distributed in the binder (e.g. an epoxy resin).

Figure 4:
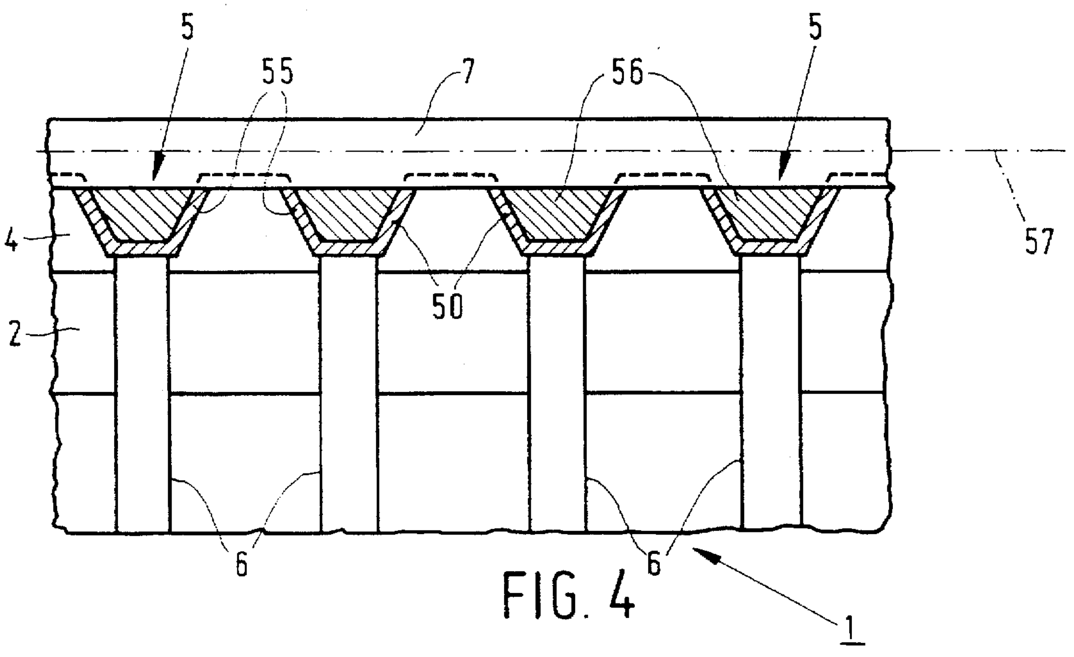
FIG. 4 is a similar cross-section of a second embodiment of an image-recording element according to the invention.

In a preferred embodiment illustrated in FIG. 4, the conductive image-forming electrodes 5 are formed from a combination of a thin metal layer 55 applied to the surface of the grooves 50 and a conductive epoxy resin 56 with which the rest of the grooves 50 is filled. The thin metal layer 55 appears to be a better control means for obtaining the correct resistance value for the image-forming electrodes 5 than the above-mentioned embodiment in which conductive particles are finely distributed in the binder (the epoxy resin). In principle, a number of materials such as Cu, Ta, tantalum nitride and NiCr can be used for the metal layer 55. Outstanding results have been obtained with an 0.25 μm thick NiCr layer applied uniformly to the groove pattern by means of the known sputter technique in a vacuum installation, e.g. of the Balzers LLS 802 type, NiCr being sputtered from an NiCr 30/70 target with a 99.9% purity, argon and oxygen being introduced into the vacuum installation.

A conductive epoxy resin is then applied to this metal layer to give a layer thickness indicated by broken line 57 in FIG. 4. The epoxy resin used was a dispersion consisting of 100 parts by weight of epoxy resin (Shell Epikote 828 EL type), 10 parts by weight of latent hardener (Ajinomoto MY-24) and 8.9 parts by weight of carbon of Degussa Printex XE-2 type. Similarly to the embodiment in FIG. 3, this epoxy layer (and in this embodiment also part of the metal layer 55), is then turned on the lathe until the insulating intermediate layer 4 is exposed at the surface, between the grooves, whereupon the $SiO_x$ top layer 7 is applied as described hereinbefore.

One of the reasons why NiCr is a suitable material as a metal layer arises out of the above-described production method, wherein the part of the metal layer 55 indicated by broken lines in FIG. 4 is also removed by turning. NiCr proves to be much better to machine than other materials such as Ta and tantalum nitride, which are suitable for electrical reasons.

With the above-described 0.25 μm NiCr layer in combination with the conductive epoxy resin a resistivity of 0.1 Ω.cm is obtained, which is within the limits of the required resistivity (0.008–0.2 Ω.cm). In the event of a change of the electrical properties of the conductive epoxy resin 56 or the dielectric top layer 7, it may be necessary to adapt the resistivity of the metal layer 55 to some extent. Such adaptation can be obtained fairly simply with the following control means: the composition of the NiCr target, the quantity of oxygen doped during sputtering and the process time for sputtering so that a different layer thickness is achieved. The influence of these control means is such that a larger quantity of Cr in the target and/or more oxygen doping gives a higher resistance and a longer process time and hence a greater layer thickness gives a lower resistance.

The above description describes the use of different types of epoxy resins in a number of applications. On the one hand, the epoxy resin is used as glue for sticking together a number of parts of the control element 3 (the copper foil in which the conductive track pattern 12 is formed on the aluminum support 10 and the cover 14 on the support 10) and for gluing the control element 3 securely in the axial slot of the aluminum cylinder 2. On the other hand, a different type of epoxy resin is applied to the surface of the aluminum cylinder 2 in order to provide the insulating intermediate layer 4.

In all these applications, good adhesion of the epoxy resin to the metal components (aluminum or copper) is very important. It has been found that this adhesion can be considerably improved by dispersing in the epoxy resin core shell powder particles consisting of a core of rubber (e.g. butyl acrylate or butadiene/styrene) with a shell of acrylic resin therearound (e.g. polymethylmethacrylate). Core shell powder particles of this kind are marketed inter alia by Rohm & Haas under the name Paraloid EXL for improving the mechanical properties (e.g. impact strength) of thermoplastics. A modified epoxy resin with excellent adhesion properties can be prepared, for example, by homogeneously distributing with means known per se 5–20 parts by weight of the above-mentioned core-shell powder particles (Paraloid EXL 2600 type) having a particle size of 0.2 μm in 80–95 parts by weight of epoxy resin (Epoxy Technology Epotek 377 type).

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An image-forming device comprising, in combination, a movable image-recording element including a support with a dielectric surface layer and, at least a set of separately energizable image-forming electrodes insulated from one another beneath said dielectric surface layer, an image-forming zone situated along a trajectory of said image-recording element, a backing electrode disposed a short distance above said dielectric surface layer of said image-recording element, and control means for applying a voltage between said image-forming electrodes and said backing electrode in accordance with an image pattern for recording, a toner powder source for presenting toner powder to said image-forming zone at said dielectric surface layer of said image-recording element in accordance with said image pattern, characterized in that said image-forming electrodes consist of an electrically conductive material having an electrical resistivity of between 0.008 and 0.2 Ω.cm.

2. An image-forming device according to claim 1, wherein said image-forming electrodes comprise a number of parallel grooves extending in a direction of movement of said support, characterized in that said grooves are filled with electrically conductive materials providing a first conductive layer applied to said grooves, and a second conductive layer which fills any remaining volume of said grooves not filled by said first conductive layer, the resistivity of said first conductive layer being lower by a factor of from $0.125 \times 10^3$ to $2 \times 10^3$ than that of the second conductive layer.

3. An image-forming device according to claim 2, wherein said first conductive layer consists of an NiCr alloy.

4. An image-forming device according to claims 2 or 3, wherein said second conductive layer consists of an epoxy resin containing carbon particles.

5. An image-recording element for use in an image-forming device according to claim 1, comprising a support having a dielectric surface layer and a set of separately energizable image-forming electrodes beneath said dielectric surface layer, which electrodes are insulated from one another and which consist of a number of parallel grooves extending in a direction of movement of said support, said grooves being filled with electrically conductive material such that said image-forming electrodes have a resistivity between about 0.008 and 0.2 Ω.cm.

6. An image-recording element according to claim 5, wherein said electrically conductive material forms a first conductive layer applied to the surface of the grooves and a second conductive layer which fills any remaining volume of the grooves, the resistivity of said first conductive layer being lower by a factor of from $0.125 \times 10^3$ to $2 \times 10^3$ than that of the second conductive layer.

7. An image-recording element according to claim 6, wherein said first conductive layer consists of an NiCr alloy.

8. An image-recording element according to claims 6 or 7, wherein said second conductive layer consists of an epoxy resin containing carbon particles.

* * * * *